Dec. 18, 1923.  
A. GIVEN  
1,478,180  
PROCESS FOR EXTRACTING SULPHUR FROM SPENT OXIDE FROM GAS PLANTS  
Filed Nov. 21, 1918   5 Sheets-Sheet 2

FIG. 2

INVENTOR  
Arthur Given  
BY Townsend & Decker  
ATTORNEYS

Dec. 18, 1923. 1,478,180
A. GIVEN
PROCESS FOR EXTRACTING SULPHUR FROM SPENT OXIDE FROM GAS PLANTS
Filed Nov. 21, 1918  5 Sheets-Sheet 4

A. GIVEN 1,478,180

PROCESS FOR EXTRACTING SULPHUR FROM SPENT OXIDE FROM GAS PLANTS

Filed Nov. 21, 1918   5 Sheets-Sheet 5

FIG. 5

INVENTOR
Arthur Given
BY Townsend & Deeher
ATTORNEYS.

Patented Dec. 18, 1923.

1,478,180

UNITED STATES PATENT OFFICE.

ARTHUR GIVEN, OF NEWARK, NEW JERSEY, ASSIGNOR TO STEVENS-AYLSWORTH COMPANY, OF NEW YORK, N. Y., A CORPORATION OF NEW YORK.

PROCESS FOR EXTRACTING SULPHUR FROM SPENT OXIDE FROM GAS PLANTS.

Application filed November 21, 1918. Serial No. 263,474.

*To all whom it may concern:*

Be it known that I, ARTHUR GIVEN, a citizen of the United States, and a resident of Newark, in the county of Essex and State of New Jersey, have invented certain new and useful Improvements in Processes for Extracting Sulphur from Spent Oxide from Gas Plants, of which the following is a specification.

My invention has for its object the extraction of sulphur from spent oxide from gas works by an improved and novel process by means of which the extraction is thoroughly and quickly effected at small cost and without waste of the solvent employed for the purpose of extraction, my invention being more particularly an improvement on the invention shown and described in my prior Patent No. 1,404,199, dated January 24, 1922.

A further object of my invention is the extraction of sulphur from spent oxide from gas works in a continuous manner that is without interruption of the process for the purpose of charging the device by means of which the process is practiced with oxide or discharging it therefrom or for any other reason.

Other and further objects of my invention will appear from the accompanying description, the invention consisting in the novel process hereinafter more particularly described and then specified in the claims.

In the accompanying drawings which illustrate the invention more or less diagrammatically.

Figure 1:
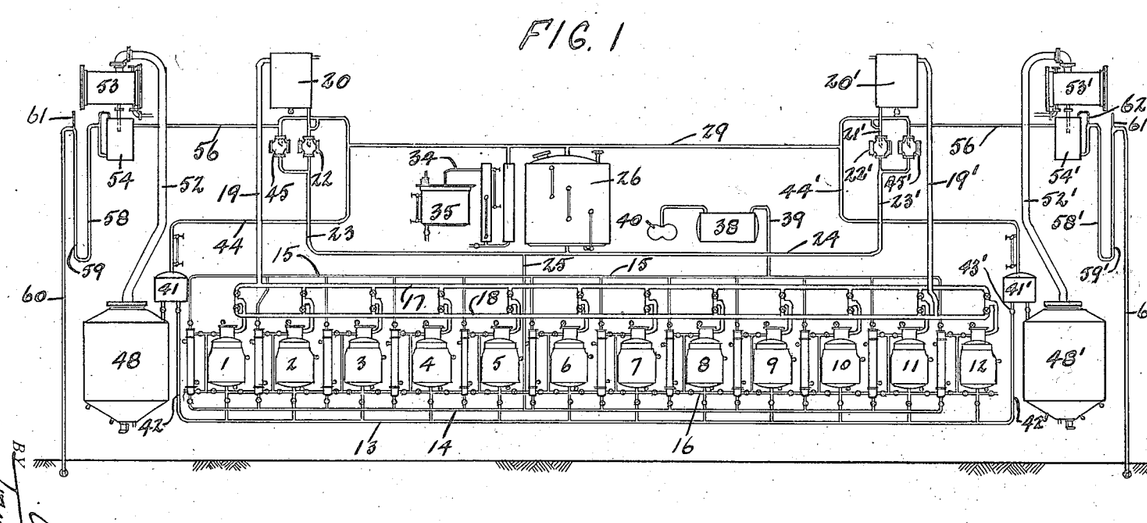
Fig. 1 is a front elevation of the new apparatus for extracting sulphur from spent oxides from gas works by my improved process.
Figure 3:
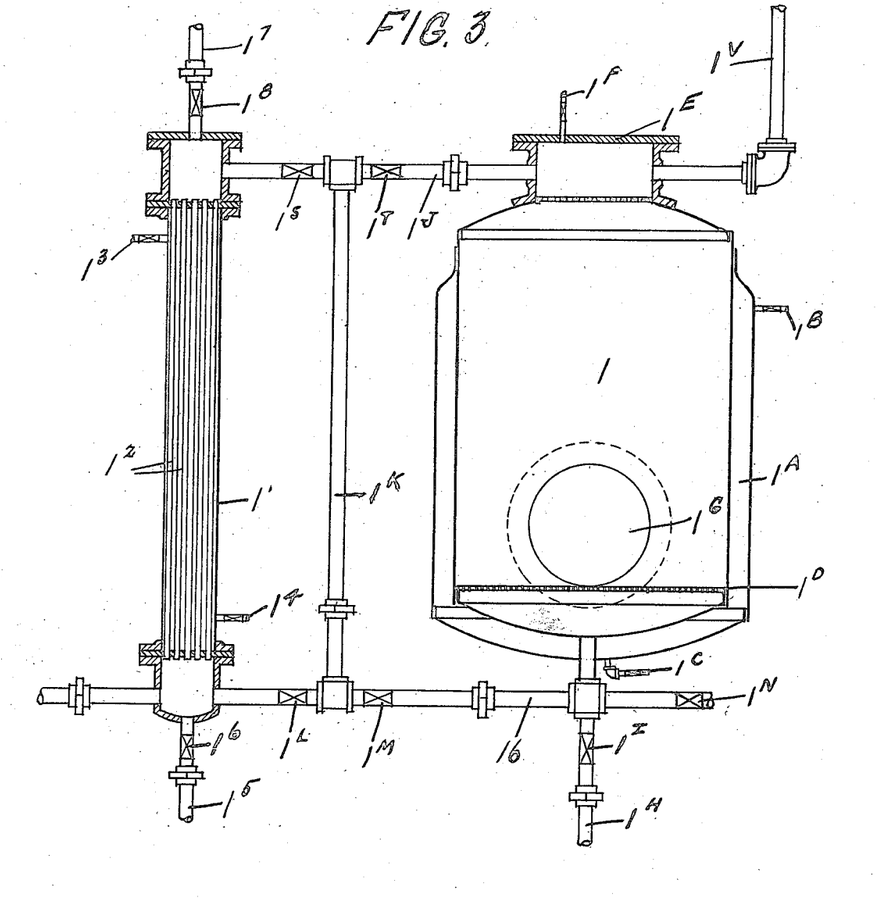
Fig. 3 is a further enlarged view of one of the extractor tanks.
Figure 4:
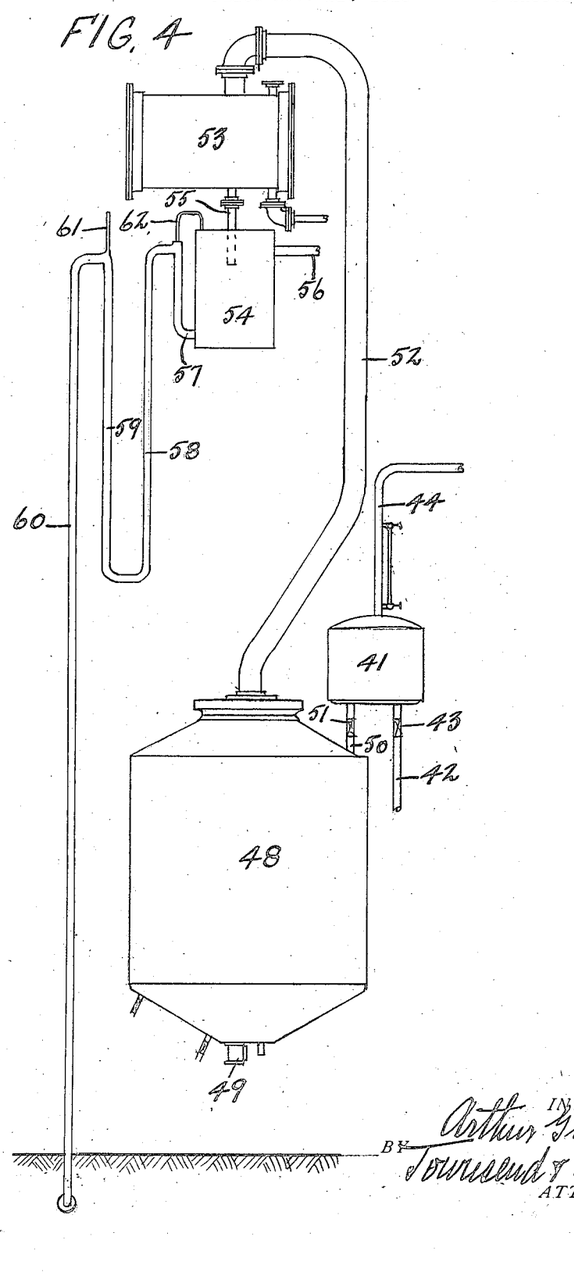
Fig. 4 is an enlarged view of the portion of the apparatus embodying one of the stills and the condenser connecting therewith.

Referring more particularly to the several figures of the drawings, 1 to 12 inclusive indicate a series or plurality of extractor tanks arranged side by side and supported in any desirable manner and adapted to hold the oxide from which the sulphur is to be extracted. Each of said extractor tanks has connected therewith a solvent heater 1' to 12' respectively inclusive for heating the solvent employed in the extraction process. One of the extractor tanks, for instance extractor tank 1, with the connecting heater 1' (see Fig. 3) will be described in detail it being understood that all the extractor tanks and heaters are identical in construction.

The extractor tank 1 is provided with a conventional form of steam-jacket $1^A$ having an inlet steam-pipe $1^B$ and an exhaust steam-pipe $1^C$ each of which is provided with a suitable cock. The tank is also provided with an inner false bottom $1^D$ the construction of which is preferably a wood grating covered with burlap and the function of which is to receive and support the oxide and to prevent the fine particles thereof from entering the piping system of the apparatus. The extractor tank is also provided with a removable cover $1^E$ having an air-pipe $1^F$ with a suitable cock thereon, said extractor tank being also provided with a delivery opening having a removable cover or closure $1^G$ therefor (Fig. 3) so that the oxide may be removed from the tank when the extraction is completed:

The solvent heater 1' is provided, as are all of said solvent heaters, with the interior pipes $1^2$ and a steam-jacket with suitable inlet and outlet steam-pipes $1^3$ and $1^4$.

Each of the extractor tanks 1 to 12 inclusive is provided with vertical pipes $1^H$ to $12^H$ inclusive connecting with the bottoms of the extractor tanks and provided with suitable cocks $1^I$ to $12^I$ inclusive, said vertical pipes being joined together by a saturated solution pipe 13. Likewise, the bottom of each of said heaters 1' to 12' is respectively provided with pipes $1^5$ to $12^5$ inclusive connecting therewith and having suitable cocks $1^6$ to $12^6$ therein, said pipes being joined together by solvent pipe 14. Connecting with the top of the heaters 1' to 12' inclusive are pipes $1^7$ to $12^7$ inclusive provided respectively with cocks $1^8$ to $12^8$, said pipes $1^7$ to $12^7$ inclusive being all connected together by the compressed air pipe 15.

Joining together and making connection between the bottoms of the solvent heaters 1' to 12' inclusive and the pipes $1^H$ to $12^H$ of the extractor tanks 1 to 12 is the pipe 16. The ends of said pipe 16 are connected together although they are shown as broken away in the drawing. Connecting the tops of the extractor tanks 1 to 12 inclusive with each of its adjoining solvent heaters 1' to 12' inclusive respectively are the short horizontal pipes $1^J$ to $12^J$ inclusive, and connecting the pipes $1^J$ to $12^J$ inclusive and pipe 16 are the vertical pipes $1^K$ to $12^K$ inclusive respectively. The pipe 16 is provided therein with 12 series of three cocks $1^L$, $1^M$, $1^N$ to $12^L$, $12^M$, $12^N$ inclusive respectively for each of the extractor tanks and heaters, said cocks being arranged in the pipe 16 in the positions illustrated. Each of the pipes $1^J$ to $12^J$ is likewise provided with two cocks $1^S$, $1^T$ to $12^S$, $12^T$ respectively. While the smallness of the figures and particularly Fig. 1 will not readily permit of the marking of each individual part and each separate cock, it will be understood that the numbers with the same exponents refer to the cock, pipe or other part for each extractor tank and solvent heater as the cock, pipe or part occupying the same relative position and bearing the same number for extractor tank 1 and solvent heater 1'. This it will be understood applies equally well to other parts of the apparatus to be hereinafter described and referred to by the same numbers but said numbers having different exponents.

Figure 2:
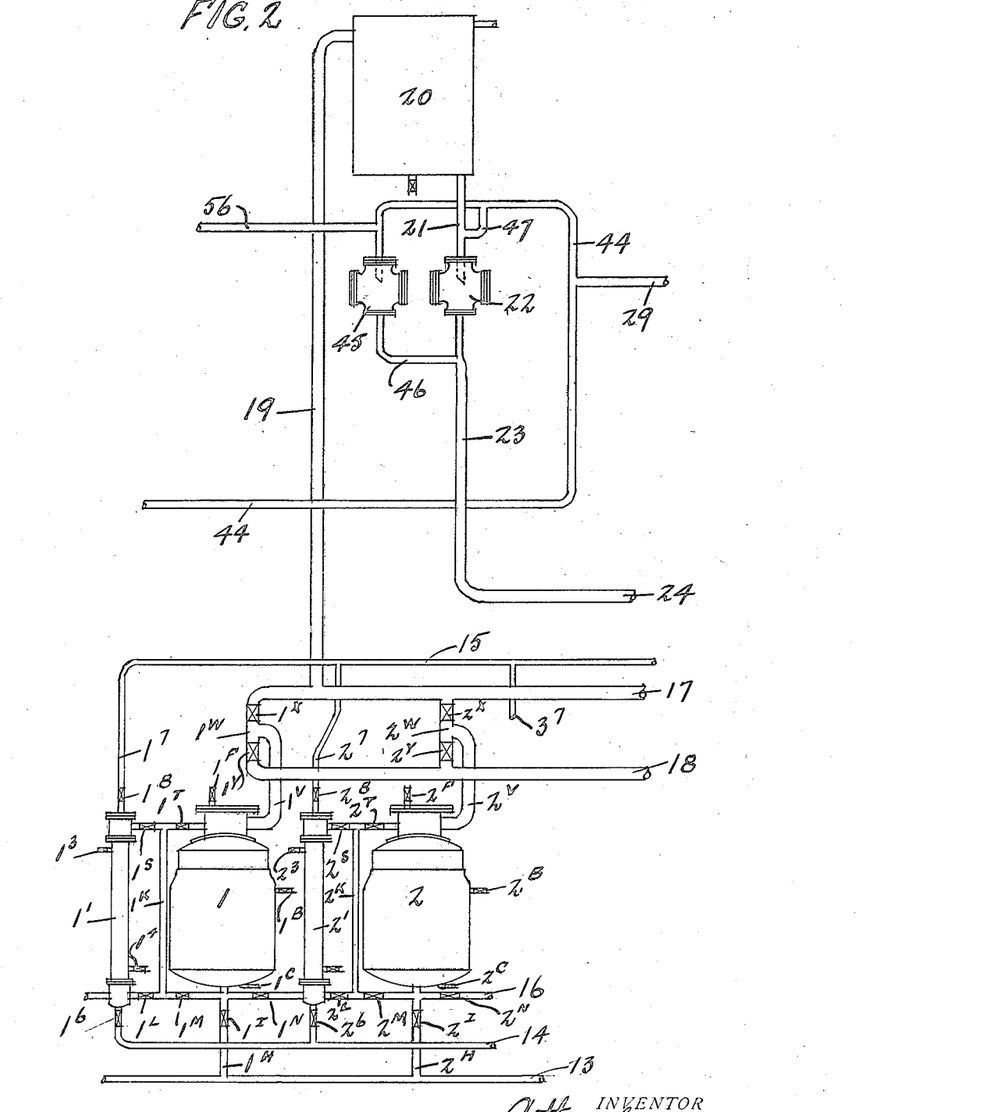
Fig. 2 is an enlarged view of a portion of the apparatus showing two of the extractor tanks and the connections therebetween as well as one of the condensers.

The tops of the extractor tanks 1 to 12 have connected therewith pipes $1^V$ to $12^V$ respectively which are connected with pipes $1^W$ to $12^W$ joining together the upper and lower parallel extractor vapor pipes 17 and 18. The pipes $1^W$ to $12^W$ each has two cocks therein $1^X$, $1^Y$ to $12^X$, $12^Y$ respectively (see Fig. 2). The said extractor vapor pipes 17 and 18 are respectively connected by means of pipes 19 and 19' to the condensers 20 and 20' the interior pipes and parts of which are not shown, said condensers being also provided with the usual inlet and outlet water pipes. The outlet pipes 21 and 21' through which the condensed solvent flows as will hereinafter be explained is joined to the tops of sight-boxes 22 and 22' preferably provided with sight-glasses or lunettes in either of the sides thereof. The bottoms of the sight-boxes 22 and 22' are connected by pipes 23, 23' to the main solvent pipe 24 which in turn is connected by a pipe 25 to the solvent pipe 14. (See Fig. 1.)

Figure 5:
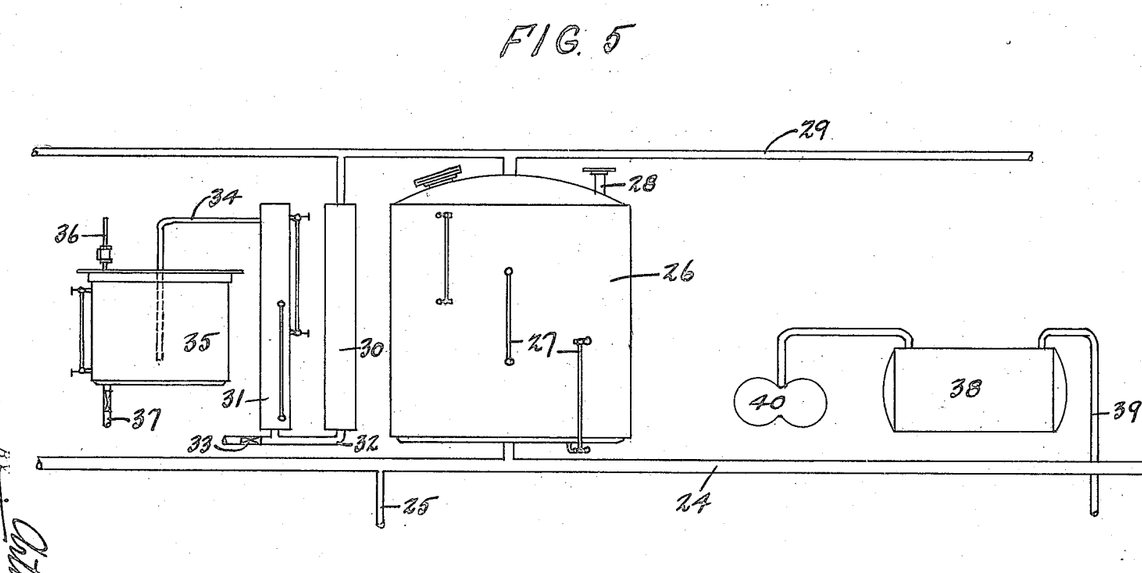
Fig. 5 is an enlarged view of the solvent tank with the adjacent pressure regulating tanks and air blower.

26 indicates the main solvent supply tank (see Fig. 5) which is connected at its bottom with the solvent pipe 24. Said solvent supply tank is supplied with the usual gauges so that the amount of solvent therein may be determined by visual inspection. The tank is also provided with an inlet 28 adapted to be connected with a suitable source of solvent supply. 29 indicates an air pressure equalizing pipe connecting with the solvent tank 26 as illustrated as well as with other parts of the system so that the pressure therein will remain the same. Said pipe 29 is also connected with one of two pressure regulating tanks 30 and 31 similar in construction to, and having the same function as, those described in my previous application for patent above referred to. Joining the two pressure regulating tanks at their lower ends is a pipe 32 having a suitable cock 33 therein so that water may be forced in said tanks or allowed to drain therefrom. Tank 31 is preferably provided with suitable gauges as shown, so that the amount of water in said tanks may be ascertained visually, and said tank is connected adjacent its top by pipe 34 with a closed scrubber 35, said pipe 34 extending downwardly through the closed top of the scrubber (Fig. 5) and terminating adjacent the bottom thereof. The said scrubber is provided with an air pipe 36, an outlet 37, with a suitable cock therein, and also a gauge on the side thereof so that the height of the level of the liquid therein may be determined.

38 indicates a suitable compressed air tank connected by pipe 39 with the compressed air pipe 15. Connected also with the compressed air tank 38 is a blower 40 so that compressed air may be forced into pipe 39 and pipe 15 when so desired.

On either side of the apparatus and forming a part thereof are located the measuring tanks 41 and 41' connected by pipes 42 and 42' respectively with the saturated solution pipe 13. Said pipes 42 and 42' have cocks 43 and 43' therein as illustrated. Connecting with the tops of the measuring tanks are the pipes 44 and 44' provided respectively with suitable gauges as shown. Said pipes 44, 44' are connected with air pressure equalizing pipe 29 (see Fig. 2) and their ends extend downwardly into the sight-boxes 45 and 45', said sight-boxes being provided with sight-glasses or lunettes as are the sight-boxes 22, 22'. 46, 46' indicate pipes connecting respectively with the pipes 23 and 23' and 47, 47' are pipes connecting respectively the pipes 44, 44' and 21, 21'.

48, 48' indicate stills which are provided with suitable steam-jackets (not shown) and having steam inlets and outlets for said jackets as indicated. Said stills are also provided with outlet pipes 49, 49' which are provided with cocks or valves which may be closed or opened as desired. The said stills 48, 48' are connected respectively with the measuring tanks 41, 41' by pipes 50, 50' having suitable cocks 51, 51' therein.

The stills 48, 48' are connected by the pipes 52, 52' to the condensers 53, 53', the interiors of which are not shown, and which are provided with the usual inlet and outlet water pipes as illustrated. Said condensers 53, 53' are joined to closed water-separators 54, 54' by pipes 55, 55' which extend downwardly therein. The water-separators are connected adjacent their tops, with the pipes 44, 44' by the condensed solvent pipes 56, 56'. Connected also with the water-separators 54, 54' adjacent their bottoms are the short pipes 57, 57' which in turn are connected respectively with the counterbalancing pipes 58, 59 and 58', 59'. The said counterbalancing pipes 59, 59' are connected with the sewer pipes 60, 60'. To insure that the air in counterbalancing pipes 59, 59' is under atmospheric pressure, said pipes are provided in their upper ends with the open pipes 61, 61'. The tops of the water-separators 54, 54' and the tops of the short pipes 57, 57' are also respectively joined together by connections 62, 62' so that the pressure in said water-separators and said short pipes will be the same in order to prevent siphoning of the liquid in the water-separators over into the counterbalancing pipes.

My improved process of extraction is practiced as follows:

The solvent tank 26 is filled with solvent which is preferably benzol although the invention is not limited thereto. The condensers 20, 20', 53 and 53' are filled with water, the pressure regulating tanks 30, 31 about half filled with water, the scrubber 35 partly filled with oil, and extractor tank 1 is charged with oxide or other substance from which the sulphur is to be extracted.

Assuming all the cocks in the system are closed, the cock in air pipe $1^F$ of extractor tank 1 is opened and then the cocks $1^6$, $1^S$ and $1^M$. As is obvious, the solvent in the tank 26 then flows by gravity down through pipe 25, through the solvent pipe 14 up through the pipes in the heater 1', down through pipe $1^K$, through pipe 16 and up through extractor tank 1 driving the air out of said tank before it and up through air pipe $1^F$. When the solvent appears at the top of air pipe $1^F$, the cock therein is closed as well as the cock $1^M$ as the extractor tank is then filled with solvent. The solvent is allowed to remain in the extractor tank for from twenty to thirty minutes and by its solvent action it extracts a large amount of sulphur from the oxide in the tank, the efficacy of the extraction process being greatly increased by the heating of the solvent when passing through the heater 1'. After the solvent remains in the extractor tank for a sufficient time, cock $1^T$ is opened as well as cocks $1^N$, $2^S$, $2^M$ and the cock in air pipe $2^F$ of extractor tank 2. Obviously then, the solvent in extractor tank 1, partly saturated with sulphur, is forced, by fresh solvent which flows into extractor tank 1, up through heater 2', becoming reheated therein, down through pipe $2^K$ and up through the extractor tank 2 which has meanwhile been filled with oxide, and drives out the air from the extractor tank before it. When the extractor tank 2 is filled, the cock in the air pipe $2^F$ is closed as well as cock $2^M$ and cock $2^T$ is opened. When the partly saturated solvent flows out of extractor tank 1 into extractor tank 2 in the manner just explained, fresh heated solvent flows into the top of and fills extractor tank 1 as is apparent.

While extractor tank 3 is being filled with oxide, cock 43 in pipe 42 and cock $2^I$ in pipe $2^H$ are opened. The solvent in extractor tank 2 then having passed through both extractor tanks 1 and 2 and having become saturated with sulphur, is allowed to flow through pipe $2^H$ through saturated solution pipe 13, up through pipe 42 and into the measuring tank 41. When the measuring tank has become filled, which is determined by an inspection of the gauge on the side thereof, cock 43 is closed and cock 51 in pipe 50 is opened thereby permitting the saturated solution in the measuring tank to flow into the still 48. The cock 51 is then closed and 43 again opened and measuring tank 41 again filled by gravity due to the head of the liquid in the tank 26 and contents of tank 41 is again permitted to flow into the still. In other words two "draws" are taken from the extractor tank 2 and permitted to flow in the manner described into the still and after the second draw the cocks $2^I$ and 51 are closed. Obviously, as each "draw" is made from extractor tank 2, the partly saturated solvent in extractor tank 1 flows into extractor tank 2 and fresh solvent flows into extractor tank 1, the solvent of course passing up through the heaters and down through the top of the extractor tanks as has been explained.

After the two "draws" of solvent have been taken from extractor tank 2 the proper cocks adjacent extractor tank 3 are opened to permit the solvent in extractor tank 2 to flow up through heater 3 and up through the extractor tank 3 as in the previous cases, the extractor tanks, of course, always having been filled with oxide before solvent is permitted to flow therein. Three "draws" are then taken from extractor tank 3 while number 4 is being filled with oxide, the process being continued until extractor tank 9 is reached and two and three "draws" being taken alternately from the extractor tanks, that is two "draws" from the even numbered tanks and three "draws" from the odd numbered tanks. Meanwhile after three "draws" have been taken from extractor tank 3 distillation is started in the still 48, it then containing five "draws" of saturated solvent. Steam is turned into the steam-jacket of the still to heat the same and vaporize the solvent to leave the sulphur free. The solvent vapor flows up through the pipe 52, through the pipe in the condenser 53 and thence into the water-separator 54 in liquid form. Inasmuch as benzol is lighter than water the condensed solvent floats therein in the water-separator until it reaches the level of the condensed solvent pipe 56 when it flows through said pipe, through the sight-box 45, through pipe 46, pipe 24 and back again into the solvent tank 26 or down through pipe 25 as the case may be. The excess water in the water-separator 54 flows up through the pipe 57 through the counterbalancing pipes 58, 59 and then off through the sewer pipe 60. I have found the inclusion of the counterbalancing pipes quite necessary to the proper practicing of my improved process and through which pipes the water in the water-separator flows or drains off, for the reason that thus the necessary pressure in the system is retained. This condition would not obtain if the water flowed directly through a single pipe leading from the water-separator or if it flowed directly to the sewer pipe.

When distillation of the solvent has begun the system becomes filled with solvent vapor, all parts being connected together, which may cause undue pressure unless means are provided for the escape of air. Such means are provided and consist in the pressure regulating tanks 30 and 31 and the scrubber 35 and which permit the air to escape without loss of the solvent vapor. When the pressure in the system becomes unduly high, the cock or valve in the pipe 36 of course always being open, the water in tank 30 is forced into tank 31 through pipe 32 and when tank 30 is empty, the air collecting a part of the solvent vapor mixed therewith bubbles through the water in 31 and flows through the pipe 34 and into the oil in the scrubber 35. The oil retains or absorbs the solvent but the air rises up through the oil and escapes out of pipe 36. When the oil is sufficiently saturated with solvent, it may be drawn off through pipe 37 and the solvent recovered by distillation of the mixture in any suitable still.

After two "draws" have been taken from extractor tank 8 and fresh solvent allowed to run into extractor tank 1, the same process having been practiced in the case of all the extractor tanks preceding tank 8 as was practiced in the case of extractor tanks 1 and 2 except that the number of "draws" from each varied according as to whether the tank was even or odd numbered, cock $1^c$ is closed to shut off the fresh solvent supply and the extractor tank 9 is connected with extractor tank 8 as in the previous case. The sulphur in the oxide in extractor tank 1 having now been all extracted, cock $1^s$ is closed and cock $1^L$ and $1^s$ opened and the blower 40 operated to force the compressed air in tank 38 through pipe 39, compressed air pipe 15 and into the top of heater 1 thereby forcing the solvent therein through pipe $1^K$ into the top of extractor tank 1 and driving out before it all of the solvent in the extractor tank 1 into the next succeeding heater and extractor tank, the same operation taking place in the case of all the heaters and extractor tanks so that extractor tank 9 is thereby filled by solvent from the preceding tank and extractor tank 1 is practically emptied of solvent. Cocks $1^s$, $1^T$ and $1^N$ are then closed and cock $2^c$ opened to permit more solvent to flow into heater $2'$ after which three "draws" are taken from extractor tank 9. The proper cocks are then opened or closed as the case may be, so that the solvent supply tank is "cut out", extractor tank 10 filled with solvent from the preceding tank by compressed air as was extractor tank 9, this process being continued from tank to tank in an obvious manner, while at the same time the distillation of the solvent vapor flowing from still 48 and the recovery of the distilled solvent continues without interruption. Obviously then, when extractor tank 9 is reached, and as each new extractor tank on the right of the system is put into operation, one extractor tank on the left is "cut out." When extractor tank 1 has been "cut out", it is desirable to recover what solvent remains therein before the oxide with the sulphur extracted is removed therefrom. This is done by allowing steam to enter the jacket $1^A$ of the extractor tank to heat the same and opening the cock $1^X$ in pipe $1^W$ while at the same time opening cocks $1^L$ and $1^M$ and slightly opening cock $18^t$ and forcing a gentle current of heated air up into the extractor tank through the bottom thereof. The solvent vapor then flows from the extractor tank through pipes $1^V$ and 19 and through the condenser 20, the condensed solvent then flowing through the sight-box 22 through pipes 23 and 24 and back into the solvent tank 26 or through pipe 25. When distillation has been completed and all the solvent in extractor tank 1 recovered which may be determined by noting a cessation of flow of distilled solvent through sight-box 22, the cock $1^X$ is closed as well as cocks $1^s$, $1^L$ and $1^M$ and the steam is also turned off in the jacket 1ᴬ. The oxide in the extractor tank 1 may then be removed through the delivery opening 1ᴳ.

Before the remaining solvent in extractor tank 1 has been recovered by distillation, as just described, and the oxide removed therefrom, extractor tank 2 has been "cut out" and is ready for the same steps. When the extractor tank 2 is heated, however, the cock 2ʸ in pipe 2ᵂ is opened instead of cock 2ˣ so that the solvent vapor from extractor tank 2 flows through pipes 18, 19′ and through condenser 20′, and the distilled solvent thence flows through pipe 21′, sight-box 22′, pipe 23, pipe 24 and into the solvent tank or pipe 25. Thus the recovering of the solvent remaining in the extractor tanks and the removal of the oxide from the tanks may be effected simultaneously with two of the tanks. By the time tank 3 is "cut out" all the solvent remaining in tank 1 has been recovered so that tank 3 is connected with condenser 20, the purpose being to use condenser 20 in connection with the recovery of the remaining solvent in the odd numbered tanks and condenser 20′ in connection with the recovery of the remaining solvent in the even numbered tanks.

After the extractor tank 12 has been reached in the practicing of the process, extractor tank 1 has been re-charged with oxide and extractor tank 12 is then connected with the heater 1′ of extractor tank 1, it having been heretofore explained that pipe 16 is a continuous and endless one, it being shown however, broken away in the drawing (Fig. 1). As is manifest, therefore, the previous steps can be repeated and each extractor tank charged, "cut out" and discharged in the manner previously explained so that the process may be continued indefinitely except that stills 48 and 48′ are used alternately as will now be explained. When the sulphur has been extracted from the oxide in twelve extractor tanks the still 48 has accumulated all the saturated solvent it can conveniently handle. Thereafter, that is until the process has continued for twelve more tanks, the "draws" of saturated solvent from the extractor tank are run into measuring tank 41′ by opening the cock 43′ instead of allowing the saturated solution to run into the measuring tank 41 by opening cock 43. The distillation of the solvent in still 48 is still continued until all the solvent therein has been recovered which may be determined by observing a cessation of flow of distilled solvent through the sight-box 45. After the solvent has all been recovered the heating of the still 48 is continued to melt the sulphur therein, after which it may be drawn off in liquid form from outlet pipe 49, cooled and then broken up for shipment.

When the sulphur has been extracted from the twelve tanks a second time, still 48′ is "cut out" and still 48 "cut in," in an obvious manner, the extracted sulphur having by that time all been removed from still 48.

What I claim as my invention is:

1. The herein described process of extracting sulphur from a substance with which it is mixed consisting in placing the substance in a suitable tank, permitting a solvent to flow into said tank to displace the air therein and to submerge said substance and intermittently permitting additional solvent to flow into said tank to displace the solvent previously held therein until the extraction of the sulphur from the substance has been completed, the substance at all times being submerged in solvent during the extraction process.

2. The herein described process of extracting sulphur from a substance with which it is mixed consisting in placing the substance in a suitable tank, permitting solvent to flow up through the bottom of said tank to displace the air therein and to submerge said substance and intermittently permitting additional solvent to flow into the top of the tank to displace the solvent previously held therein until the extraction of the sulphur from the substance has been completed, the substance at all times being submerged in solvent.

3. The herein described process of extracting sulphur from a substance with which it is mixed consisting in placing the substance in a suitable tank, permitting heated solvent to flow up through the bottom of said tank to displace the air therein and to submerge the substance and intermittently permitting additional heated solvent to flow into the top of the tank to displace the solvent previously held therein until the extraction of the sulphur from the substance has been completed, the substance at all times being submerged in solvent.

4. The herein described process of extracting sulphur from a substance with which it is mixed consisting in placing the substance in a plurality of tanks, permitting a solvent to flow up through the bottom of and into one tank and then when partially saturated with sulphur forcing it down through said tank and up through the bottom of the next succeeding tank by the admission of fresh solvent in the first tank and drawing off the solvent after it has become saturated with sulphur extracted from the substance.

5. The herein described process of extracting sulphur from a substance with which it is mixed consisting in placing the substance in a plurality of tanks, permitting a solvent to flow through a heater and into the first of said tanks, permitting the partially saturated solvent to flow through a second heater and into the next succeeding tank while simultaneously permitting fresh solvent to flow into the first tank, continuing the process as to as many of the remaining tanks as are necessary to saturate the solvent with sulphur, then drawing off the saturated solution and separating the solvent therefrom, to leave the sulphur free.

6. The herein described process of extracting sulphur from a substance with which it is mixed consisting in placing the substance in a series of tanks, treating the substance in said tanks successively and in rotation with solvent, cutting out the first of said tanks when all the sulphur from the substance therein has been extracted and then connecting an additional tank with substance therein to the series and treating the substance in said additional tank with a solvent in the same manner.

7. The herein described process of extracting sulphur from a substance with which it is mixed consisting in placing the substance in a series of tanks, permitting a heated solvent to flow through the first of the series of tanks and then successively through the remaining tanks, connecting a new tank to the series and permitting the solvent to flow therethrough when all the sulphur from the substance in the first tank has been extracted, cutting the first tank out of the series and thereafter continuously repeating the same cycle of operations.

8. The herein described process of extracting sulphur from a substance with which it is mixed consisting in placing the substance in a series of tanks, permitting a solvent to flow through the first of the series of tanks and then successively through the remaining tanks, drawing off the solvent when it has become saturated with sulphur and separating the solvent from the saturated solution to leave the sulphur free, permitting additional solvent to flow through said tanks, adding a new tank to the series when all the sulphur from the substance in the first tank of the series has been extracted, cutting the first tank out of the series and thereafter continuously repeating the same cycle of operations while at the same time permitting additional solvent to flow into the tanks whenever necessary.

9. The herein described process of extracting sulphur from a substance with which it is mixed consisting in placing the substance in a series of tanks, permitting a heated solvent to flow through the first of the series of tanks and then successively through the remaining tanks, permitting the solvent when it has become saturated with sulphur to flow into a suitable still, recovering the solvent by distillation from the saturated solution to leave the sulphur free, adding a new tank to the series, when all the sulphur from the substance in the first tank of the series has been extracted, cutting the first tank out of the series and recovering the solvent remaining therein and thereafter continuously repeating the same cycle of operations while at the same time permitting additional heated solvent to flow to the series of tanks whenever any saturated solution is drawn off for the purpose of separating the solvent therefrom by distillation to leave the sulphur free.

10. The herein described process of extracting sulphur from a substance with which it is mixed consisting in placing the substance in a series of tanks, permitting a solvent to flow through the first of the series of tanks and then successively through the remaining tanks, connecting a new tank to the series and permitting the solvent to flow therethrough when all the sulphur has been extracted from the substance in the first tank, forcing the solvent remaining in the first tank into one of the succeeding tanks by fluid pressure, cutting the first tank out of the series and thereafter repeating the same cycle of operations as to the remaining tanks.

11. The herein described process of extracting sulphur from a substance with which it is mixed consisting in placing the substance in a series of tanks, permitting a solvent to flow through the first of the series of tanks and then successively through the remaining tanks, connecting a new tank to the series and permitting the solvent to flow therethrough when all the sulphur has been extracted from the substance in the first tank, forcing the solvent remaining in the first tank into one of the succeeding tanks by fluid pressure, cutting the first tank out of the series and thereafter repeating the same cycle of operations as to the remaining tanks while simultaneously recovering by distillation any solvent remaining in the tanks containing substance from which the sulphur has been extracted.

12. The herein described process of extracting sulphur from a substance with which it is mixed consisting in placing the substance in a series of tanks, permitting a solvent to flow through the first of the series of tanks and then successively through the remaining tanks, drawing off the solution of solvent when saturated with sulphur and recovering the solvent therefrom by distillation to leave the sulphur free, permitting additional fresh solvent to flow into the first tank and then through the succeeding tanks, connecting a new tank to the series when all of the sulphur has been extracted from the substance in the first tank, forcing the solvent in the first tank into the succeeding tanks by fluid pressure, cutting the first tank out of the series and repeating the same cycle of operations as to the remaining tanks.

13. The herein described process of extracting sulphur from a substance with which it is mixed consisting in placing the substance in a series of tanks, permitting a solvent to flow through a heater and then successively and alternately through additional heaters and the remaining tanks, connecting a new tank to the series and permitting the solvent to flow therethrough when all the sulphur has been extracted from the substance in the first tank, forcing the solvent remaining in the first heater and first tank into the succeeding heaters and tanks by fluid pressure, cutting the first tank out of the series and thereafter repeating the same cycle of operations as to the remaining tanks.

Signed at Dover, in the county of Morris and State of N. J., this 14th day of November A. D. 1918.

ARTHUR GIVEN.

Witnesses:
C. A. TIBBALS, Jr.,
F. R. LANG.